Figure 1:
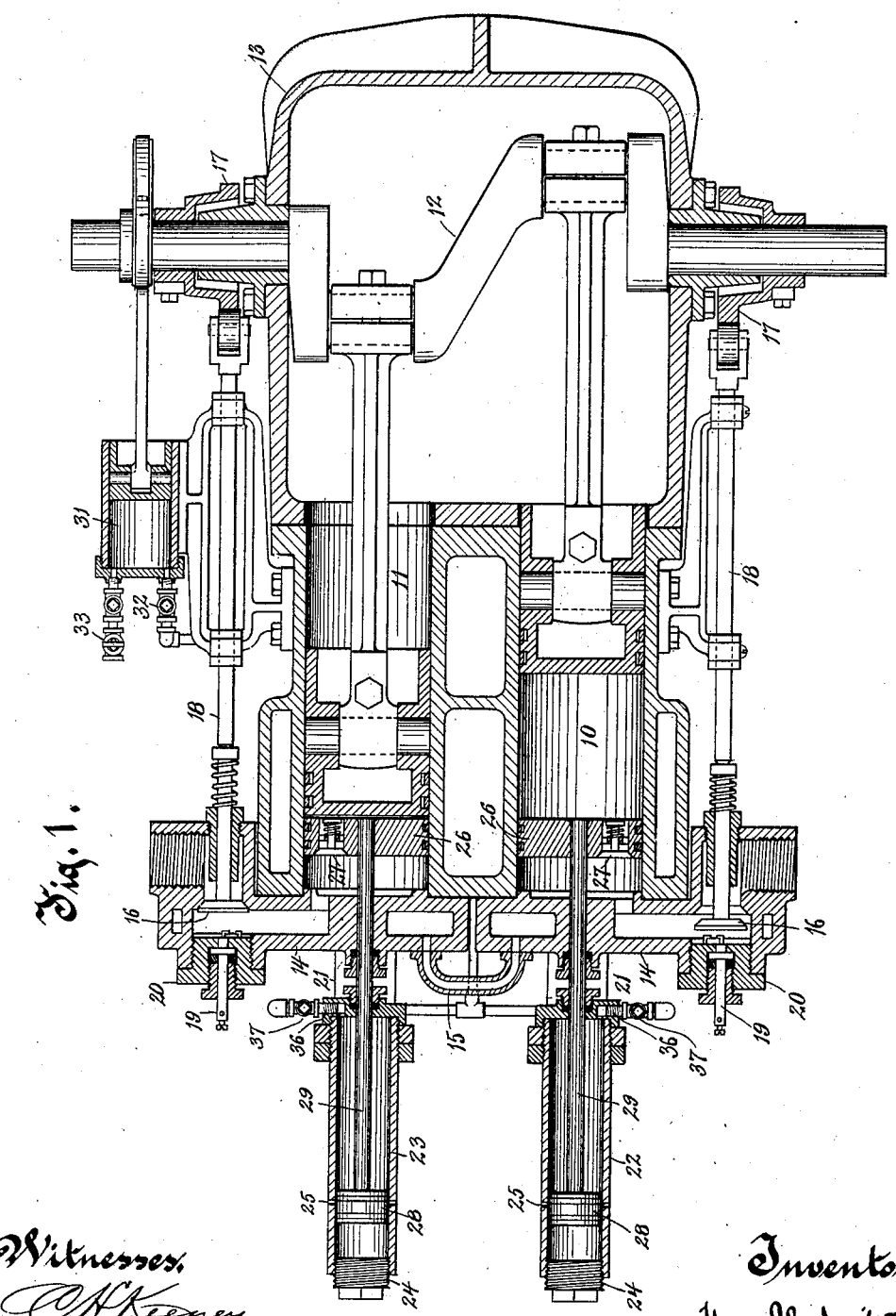

No. 763,819. PATENTED JUNE 28, 1904.
H. C. WAITE.
INTERNAL COMBUSTION ENGINE.
APPLICATION FILED MAR. 23, 1903.
NO MODEL. 4 SHEETS—SHEET 3.

Witnesses. Inventor.

No. 763,819. PATENTED JUNE 28, 1904.
H. C. WAITE.
INTERNAL COMBUSTION ENGINE.
APPLICATION FILED MAR. 23, 1903.
NO MODEL. 4 SHEETS—SHEET 4.
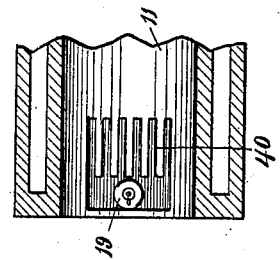
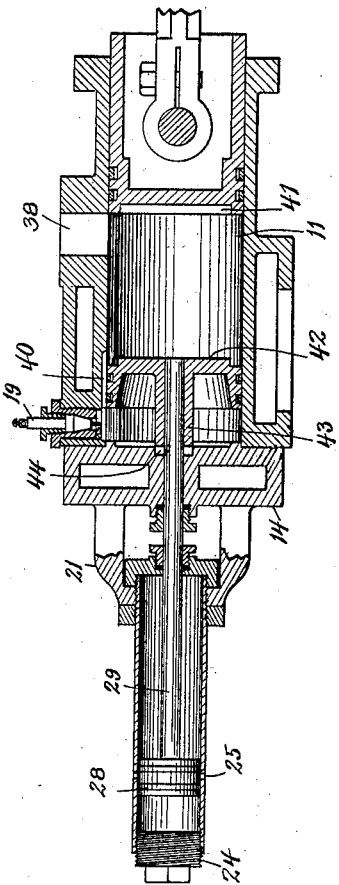

No. 763,819. Patented June 28, 1904.

UNITED STATES PATENT OFFICE.

HARRY COLE WAITE, OF MILWAUKEE, WISCONSIN, ASSIGNOR TO THE WAITE GAS ENGINE COMPANY, OF MILWAUKEE, WISCONSIN, A CORPORATION OF WISCONSIN.

INTERNAL-COMBUSTION ENGINE.

SPECIFICATION forming part of Letters Patent No. 763,819, dated June 28, 1904.

Application filed March 23, 1903. Serial No. 149,110. (No model.)

*To all whom it may concern:*

Be it known that I, HARRY COLE WAITE, residing at Milwaukee, in the county of Milwaukee and State of Wisconsin, have invented a new and useful Improvement in Internal-Combustion Engines, of which the following is a description, reference being had to the accompanying drawings, which are a part of this specification.

This invention relates to engines, and more particularly to improvements in internal-combustion engines, and has as one object the production of an engine of this class superior in many ways to those engines heretofore designed or produced with which I am familiar.

A further object is to produce a slow-speed engine as compared to other engines of the same dimensions delivering the same power.

A still further object is to produce an engine the principle of which is adaptable to engines to be utilized for many and various purposes.

These and many other objects I attain in the engine described in the specification and illustrated in the drawings presented herewith, said engine being considered a practical embodiment of the fundamental principle of this invention.

Figure 2:
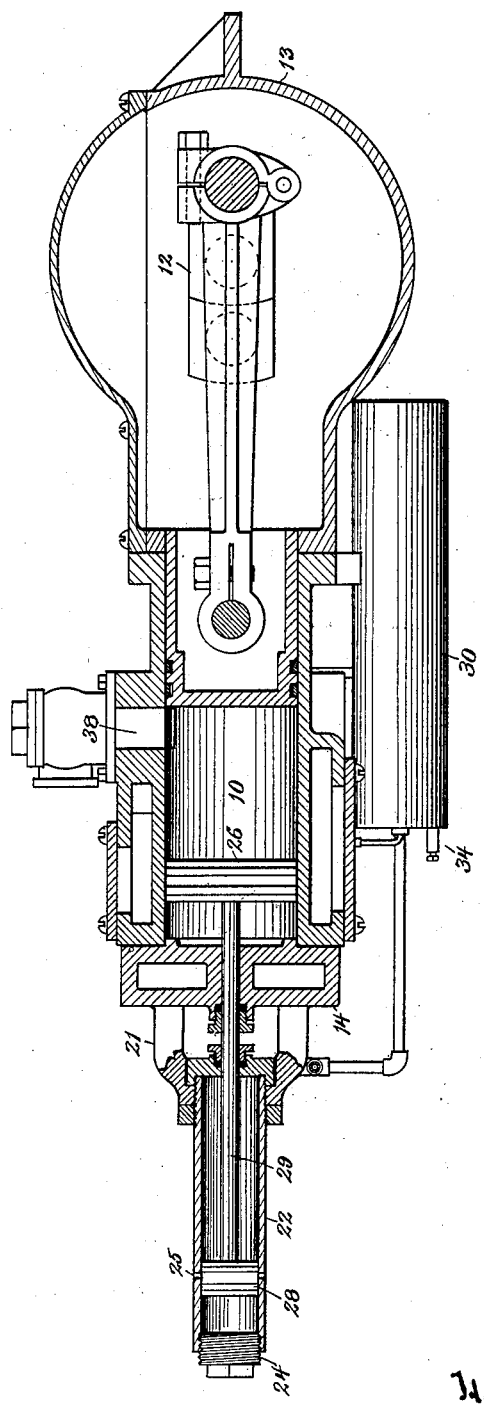
Figure 3:
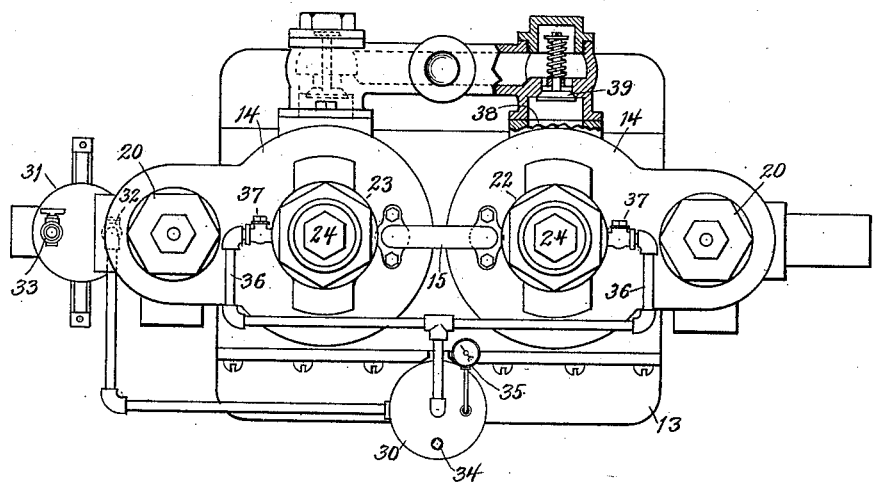
Figure 4:
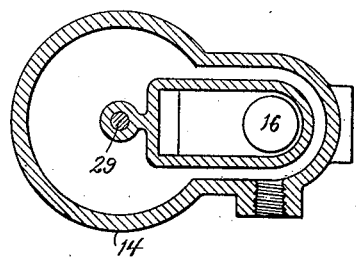

In the drawings, Figure 1 is a plan view in section of a horizontal engine embodying this invention. Fig. 2 is a view in side sectional elevation of the same. Fig. 3 is an end elevation of said engine with a portion thereof shown in section to clearly illustrate the intake-ports. Fig. 4 is a view in cross-section of one of the cylinder-heads and illustrates the water-chamber and the exhaust-port. Fig. 5 is a side view, in sectional elevation, of one of the cylinders and illustrates a modified form from the construction shown in the previous views. Fig. 6 is a detail view in section of a portion of the cylinder of the modified form.

Throughout the several views like elements are denoted by like characters.

The major portion of the engine herewith illustrated is of common and ordinary construction and consists of two cylinders 10 and 11, placed side by side and provided with suitable water-jackets, and located within the cylinders are power or main pistons connected to a crank-shaft 12 by means of suitable connecting-rods. The crank-shaft is journaled within suitable bushings secured within a crank-casing 13. Water-jacketed cylinder-heads 14 are provided, and the water-jackets of each head are preferably connected, by means of a water-pipe 15, to allow the heads to be independently cooled from the cylinders. The exhaust-passages and exhaust-valve chambers are shown cored out in the heads, and the exhaust-valves 16, which are spring-seating, are opened, by means of cams 17, through the agency of valve-rods 18, which are operated by said cams. The cams 17 are preferably formed and positioned on the shaft 12 so that they will open the exhaust-valves when the power-pistons have reached about seven-eighths of the expansion-strokes.

In Fig. 1 sparking plugs 19 are shown threaded into the exhaust-caps 20, and with these sparking plugs any suitable sparking device may be utilized, and, as is now common, the same may be arranged so that the ignition will occur when the cranks are at the desired positions.

Connected by means of yoked braces 21 and arranged axially in line with the cylinders 10 and 11 are two air-cylinders 22 and 23, each of which is provided with a plug 24, threaded into its outer end, and at the desired position in the length of each air-cylinder the same is provided with ports 25, opening the interior of said cylinder to the atmosphere. Located in each of the main cylinders between the power-piston and the cylinder-head is an auxiliary, supplemental, or scavenging piston 26, provided with a spring-seating non-return valve 27, opening toward the head end of the cylinder. Each air-cylinder is provided with a piston 28, and each of the pistons 28 is connected to the supplemental piston in the cylinder with which its air-cylinder is axially in line by means of a piston-rod 29, which passes through stuffing-glands carried by the air-cylinder head and the main-cylinder head.

An air receiver or reservoir 30, located at any convenient place adjacent to the engine, is supplied with air under compression by means of an air-pump 31, which is preferably operated by an eccentric on the main shaft. A check-valve 32 is interposed between the reservoir and the pump, and the pump-intake pipe, besides being provided with its check-valve, is provided with an ordinary air-valve 33, by means of which the amount of air taken into the pump may be regulated. The air reservoir or receiver is provided with a regulable relief-valve 34 and a pressure-gage 35. Each of the air-cylinders near its inner end is connected to the air-reservoir by means of the pipe 36, and a check-valve 37 is included in said pipe for preventing the return of air from the air-cylinders to the reservoir.

Each of the main cylinders at a point adjacent to the head of its power-piston when at the limit of its out or expansion stroke is provided with intake-ports 38, and above the intake-ports of each cylinder a spring-seating inlet-valve 39 is placed. The inlets or intakes of the two cylinders are preferably connected, and one mixing-valve, vaporizer, or carbureter, as is desired, may serve for both cylinders, as is now common. A fly-wheel or fly-wheels of suitable dimension will be carried by the main shaft.

Operation: Assume that the engine is started by cranking. The movement of each power-piston creates a vacuum in its cylinder, which is filled with explosive mixture through its intake-ports when said ports are uncovered by said power-piston on its outstrokes, as the movements of the supplemental pistons away from the cylinder-heads during the operation of cranking and until combustion occurs will only be slight, owing to the air resistance in the air-cylinders. After combustions occur the vacuums are created as the supplemental pistons move away from the power-pistons and proceed on their instrokes. As the main pistons move back on their instrokes the explosive mixture will be forced through the valved passages in the supplemental pistons into the head end of the cylinders which form the combustion-chambers, and if the sparking device is so set that ignition will occur as the cranks pass the inner dead-center then as the main pistons reach the limit of their inward movement combustions will occur and the supplemental and main pistons will be driven out on the expansion-strokes together as one piston. If the cams for operating the exhaust-valves are set so that the exhaust-valves will be opened when the main pistons have made seven-eighths of their stroke, then the supplemental pistons at that point will be forced back by the compressed air in the air-cylinders and as they reach the limit of their inward movement, having drawn in new charges and scavenged the cylinders of the old charges, be cushioned by means of the air confined between ports 25 and the plugs 24 of the air-cylinders, said plugs being adjusted so that the cushions will be sufficient to stop the supplemental pistons at the desired points. By regulating the relief-valve on the air-reservoir the pressure in the air-cylinders may be governed, and thereby the velocity of the supplemental pistons on their instrokes, independently and ahead of the power-pistons.

It will be seen that the velocity of the supplemental pistons on their instrokes may be governed and maintained independently of the piston speed of the engine.

It will be seen that the products of combustion and the incoming explosive mixture are separated by the supplemental pistons and that the engine may be scavenged to the same extent as the ordinary four-cycle type of engines are now.

It will be seen that the maximum speed of the engine may be limited by the position and dimensions given to the intake-ports in relation to the outermost position of the power-pistons.

Within certain limits it will be seen that the farther the intake-ports extend toward the head end of the cylinders the greater the attainable speed of the engine will be, for by varying the position of the intake-ports the length of time they are uncovered by the main pistons will be varied.

If desired, the intake-valves may be omitted, as the pistons will act as valves for the intake-ports.

In Figs. 5 and 6 a modified construction is illustrated, and in this construction the non-return valves in the supplemental pistons are done away with, and ports 40 are cored in the cylinders at points opposite the supplemental pistons when at the limit of their instrokes. With this construction, which is preferable to the other construction on account of simplicity, the supplemental pistons when moving on their instrokes will draw in explosive mixtures between the piston until they have passed the outer ends of ports 40, and when the main pistons move on their instrokes the explosive mixture between the pistons will be forced through said ports into the combustion-spaces at the head ends of the cylinders.

If desirable, the sparking plugs may be located, as shown in Figs. 5 and 6, in the path of the mixture or gas passing through ports 40, whereby they will be cleaned and cooled on each instroke of the main pistons.

To preclude the possibility of the supplemental and power pistons pounding together, each power-piston is provided with a recessed pocket 41, and each supplemental piston is provided with a projection 42, adapted to snugly fit said pocket, whereby an air-cushion is formed between the pistons independently of the cylinder-walls.

To prevent the supplemental pistons from moving too near the cylinder-heads in case plugs 24 should not be properly adjusted, each supplemental piston, as shown in Fig. 5, is provided with a projection 43, adapted to snugly fit a pocket 44, formed in the cylinder-head. The projection 43 will be of such length that normally or when the plug 24 is properly adjusted it will not move into said pocket.

It has been found that it is advisable to have the passages around the supplemental pistons of sufficient area to allow a free passage of the fluid therethrough from between the pistons, and it has also been found advisable to have the exhaust passages and valves large enough so that a free unrestricted exit is allowed the spent charges or products of combustion.

It has been found that the engine may be governed by controlling the intake or by varying the minimum air-pressure carried in the receiver. The engine may consist of as many cylinders as is desired and may be vertical as well as horizontal.

Many changes from the design and construction illustrated and described in this application may be made without departing from the spirit of this invention.

What I claim as my invention is—

1. In an internal-combustion engine, a cylinder with its power-piston therein, a supplemental piston in said cylinder movable with the power-piston on its out or expansion strokes, a passage around said supplemental piston when in its innermost position, and means independent of the main crank of the engine and, operating through the agency of expansible fluid for causing said supplemental piston to return on its instrokes.

2. In an internal-combustion engine, a cylinder with its power-piston therein, a supplemental piston in said cylinder movable with the power-piston on its out or expansion strokes, and means independent of the main crank of the engine and, operating through the agency of expansible fluid for causing said supplemental piston to scavenge and charge the cylinder.

3. In combination with the cylinder of an internal-combustion engine provided with an exhaust-port adjacent to its head end and an intake-port adjacent to the limit of travel of the power-piston of the engine on its outstrokes, a power-piston in said cylinder, a supplemental piston in said cylinder movable with the power-piston on its out or expansion strokes and means operated by air-pressure for causing said supplemental piston to scavenge and charge the cylinder.

4. In combination with the cylinder of an internal-combustion engine provided with an exhaust-port adjacent to its head end and an intake-port adjacent to the limit of travel of the power-piston of the engine on its outstrokes, a power-piston in said cylinder, a supplemental piston in said cylinder movable with the power-piston on its out or expansion strokes, a passage leading by the auxiliary piston when in its innermost position, and means operating by air-pressure for returning said supplemental piston on its instrokes whereby the engine is scavenged and charged.

5. A two-cycle internal-combustion engine, provided with a supplemental piston in its cylinder movable with the power-piston on its expansion-strokes, and compressed-air-operated means for causing said supplemental piston to scavenge and charge the engine-cylinder between the combustions.

6. In an internal-combustion engine, a cylinder provided with an exhaust-port adjacent to its crank end, a power-piston in said cylinder, a supplemental piston in said cylinder, and means utilizing compressed air for operating said supplemental piston to exhaust and charge said cylinder.

7. In an internal-combustion engine, a cylinder provided with an exhaust-port adjacent to its head end and an intake-port adjacent to its crank end, a power-piston in said cylinder, a supplemental piston in said cylinder and means utilizing compressed air for operating said supplemental piston to exhaust and charge said cylinder; said cylinder being provided with a fluid-passage connecting the space between the pistons with the combustion-space when said supplemental piston is in its innermost position.

8. The combination with the cylinder and power-piston therein of an internal-combustion engine, of a supplemental piston in said cylinder, an air-cylinder, a piston in said air-cylinder, a rod connecting the piston in the air-cylinder and the supplemental piston, and means for creating an air-pressure in the air-cylinder to drive the piston therein in one direction to thereby move the supplemental piston toward the head end of the power-cylinder whereby said cylinder is scavenged and charged.

9. The combination with the cylinder and main piston therein of an internal-combustion engine, of a supplemental piston in said cylinder movable with the main piston on its out or expansion strokes and adapted to exhaust the products of combustion from and draw in combustible fluid to said cylinder, an air-cylinder, a piston in said air-cylinder in connection with said supplemental piston, and means for supplying said air-cylinder with air under compression and in regulable quantities.

10. The combination in an internal-combustion engine with the power-cylinder and its piston therein, of a supplemental piston in the power-cylinder provided with a valve for allowing passage of fluid toward the head end of the cylinder, an air-cylinder, a piston in the air-cylinder, a rod connecting the supplemental piston with the piston in the air-cylinder, and a pump for supplying the air-cylinder with air.

11. The combination with a power-cylinder and its piston therein of an internal-combustion engine, of a supplemental piston in the power-cylinder movable with the power-piston on its outstrokes and provided with a valve opening toward the head end of the cylinder, a valved exhaust-port for the power-cylinder adjacent to its head end, an intake-port for the power-cylinder adjacent to the limit of the outstrokes of its piston, and means independent of the main crank of the engine and, operating through the agency of expansible fluid for causing the supplemental piston to exhaust and charge the power-cylinder.

12. In an internal-combustion engine, a power-cylinder with its piston therein, an air-cylinder, a pump for supplying said air-cylinder with air, an intake-port in said power-cylinder adjacent to the limit of travel of its piston on its outstrokes, a mechanically-operated exhaust-valve for the power-cylinder adjacent to its head end, a supplemental piston in the power-cylinder, an air-piston in the air-cylinder, a rod connecting the supplemental piston with the air-piston; said air-piston by means of compressed air in the air-cylinder being adapted to operate the supplemental piston ahead of the power-piston on the compression-strokes to scavenge and charge the power-cylinder, and a dead-air cushion for retarding the velocity of said supplemental piston as it reaches the limit of its instrokes ahead of the power-piston.

13. The combination with the cylinder and the main piston therein of an internal-combustion engine, of a supplemental piston in said cylinder adapted to exhaust the products of combustion from and draw in combustible fluid to said cylinder, an air-cylinder, a piston in said air-cylinder connected to said supplemental piston, means for supplying said air-cylinder with air, and means for regulating the amount of air supplied to said air-cylinder whereby the velocity of said supplemental piston on its scavenging and charging strokes is controlled.

14. In an internal-combustion engine, the combination with a cylinder provided with an intake-port and an exhaust-port, a valve for said exhaust-port, a main piston, a supplemental piston in said cylinder, an air-cylinder having a piston therein in operative connection with said supplemental piston, means for supplying said air-cylinder with air in regulable quantities, and means other than said exhaust-valve for retarding the velocity of said supplemental piston and cushioning it as it approaches the head end of the cylinder.

15. In an internal-combustion engine, a cylinder with its power-piston therein, a supplemental piston in said cylinder movable by the expanding fluid with the power-piston on its outstrokes, and means independent of the main crank of the engine and utilizing expansible fluid for operating said supplemental piston to scavenge and charge the cylinder.

16. In an internal-combustion engine, a cylinder with its power-piston therein, a supplemental piston in said cylinder movable by the expanding fluid with the power-piston on its outstrokes, yielding expansible means for operating said supplemental piston to scavenge and charge the cylinder, and mechanism independent of the moving parts of said engine whereby the operation of said yielding expansible means may be governed and the velocity of the supplemental piston on its scavenging and charging strokes varied.

17. The combination with the cylinder and the power-piston therein of an internal-combustion engine, of a supplemental piston in the cylinder, expansible-fluid-operated means for causing the supplemental piston to move toward the cylinder-head ahead of the power-piston whereby a chamber is formed between the two pistons, an inlet-port for delivering fluid into said chamber, a passage around the supplemental piston when in its innermost position through which the fluid in said chamber is forced by the power-piston on its instrokes, and igniting means whereby the combustions are accomplished and the pistons together are forced toward the crank end of the cylinder.

18. The combination in an internal-combustion engine, of the cylinder, the main piston in crank connection with the main shaft, a supplemental piston located in the cylinder between the main piston and the cylinder-head and movable with the main piston on its outstrokes, an air-pressure for operating the supplemental piston so that it moves on its instrokes independently and ahead of the main piston thereby tending to create a vacuum between it and the main piston, an inlet-port in the cylinder for delivering fluid between the pistons, and a port through which the fluid between the pistons is forced into the combustion-space by the main piston on its instrokes.

19. The combination in an internal-combustion engine, of the cylinder, the main piston in crank connection with the main shaft, a supplemental piston located in the cylinder between the main piston and the cylinder-head and movable with the main piston on its outstrokes, an air-pressure for operating the supplemental piston so that it moves on its instrokes independently and ahead of the main piston thereby tending to create a vacuum between it and the main piston, an inlet-port in the cylinder for delivering fluid between the pistons, a port through which the fluid between the pistons is forced into the combustion-space by the main piston on its instrokes, and means for cushioning the supplemental piston as it reaches the limit of travel on its instrokes.

20. The combination in an internal-combustion engine, of the cylinder, the main piston in crank connection with the main shaft, a supplemental piston located in the cylinder between the main piston and the cylinder-head and movable with the main piston on its outstrokes, compressed-air-operated means for moving the supplemental piston toward the head end of the cylinder ahead of the main piston thereby tending to create a vacuum between it and the main piston, a port in the cylinder for delivering fluid between the pistons and a port leading past the supplemental piston when in its innermost position through which the fluid from between the pistons is forced by the main piston on its instrokes.

21. In an internal-combustion engine, a cylinder with its power-piston therein, a supplemental piston in said cylinder movable with the power-piston on its out or expansive strokes, means regulable while the engine is in operation and independent of the power-piston for causing the supplemental piston to return, and means whereby the supplemental piston on its return strokes scavenges and charges the cylinder.

22. In a combustion-engine, the combination with the cylinder and its power-piston, of a supplemental piston located between the head of the cylinder and the power-piston and independent of the power-piston, and an air-pressure operatively connected with the supplemental piston for moving it independently of the main piston.

23. In an internal-combustion engine, a cylinder with its power-piston therein, a supplemental piston in said cylinder movable with the power-piston on its out or expansion strokes, an air-pressure operatively connected with the supplemental piston for moving it independently of the power-piston, and means whereby the supplemental piston on its return strokes scavenges and charges the cylinder.

24. In an internal-combustion engine, a cylinder with its power-piston therein, a supplemental piston in said cylinder movable with the power-piston on its out or expansion strokes, and means independent of the power-piston and operating through the agency of expansible fluid for causing said supplemental piston to scavenge and charge the cylinder.

25. In combination with the cylinder on an internal-combustion engine provided with an exhaust-port adjacent to its head end and an intake-port adjacent to the limit of travel of the power-piston of the engine on its outstrokes, a power-piston in said cylinder a supplemental piston in said cylinder movable with the power-piston on its out or expansion strokes, and means operated by air-pressure for causing the supplemental piston to return independently of the power-piston and thereby cause it to scavenge and charge the cylinder.

26. In a combustion-engine, the combination with the cylinder and the power-piston therein of a supplemental piston in said cylinder located between the head end of the cylinder and the power-piston, an air-cylinder, a piston in said air-cylinder, a rod connecting the piston in the air-cylinder and the supplemental piston, and means for creating an air-pressure in the air-cylinder to drive the piston therein in one direction and thereby move the supplemental piston toward the head end of the power-cylinder to scavenge and charge said cylinder.

27. The combination in an engine, with the power-cylinder and its piston therein, of a supplemental piston in said cylinder movable with the power-piston on its out or expansion strokes, an exhaust-port adjacent to the head end of the cylinder, an intake-port adjacent to the limit of the outward movements of the power-piston on its expansion-strokes, fluid-operated means for yieldingly forcing the supplemental piston on its instrokes ahead of the power-piston to scavenge and charge the cylinder, and means independent of the cylinder-walls forming a cushion between said pistons.

28. An internal-combustion engine having a working piston connected to the crank-shaft, an independent supplemental piston moving with the working pistons on its expansion-strokes, a regulable air-pressure for returning the supplemental piston in advance of the working piston whereby the cylinder of the engine is scavenged and charged, and means independent of the cylinder-walls of the engine forming a cushion between said pistons.

29. In a combustion-engine, a cylinder with its power-piston therein, a supplemental piston in said cylinder movable with the power-piston on its expansion-strokes, a passage around said supplemental piston when in its innermost position, and means operating through the agency of expansible fluid for causing said supplemental piston to return on its instrokes.

30. In an internal-combustion engine, a cylinder with its main piston therein a supplemental piston in said cylinder movable with the main piston on its outstrokes, a port in said cylinder connecting the space on each side of said supplemental piston when said piston is in its innermost position, and yielding means for causing said supplemental piston to return on its instrokes.

31. In an internal-combustion engine, a cylinder with its power-piston therein, a supplemental piston in said cylinder movable with the power-piston on its outstrokes, an expansible agent for returning said supplemental piston on its instrokes, and means independent of the moving parts of the engine for controlling said agent whereby the velocity of the supplemental piston on its instrokes may be governed while the engine is in operation.

32. In an internal-combustion engine, a cylinder with its main piston therein, a supplemental piston in said cylinder movable with the main piston on its outstrokes, an expansible agent for returning said supplemental piston on its instrokes, a passage connecting the spaces in the cylinder on each side of the supplemental piston when in its innermost position, and a sparking plug or other igniting device located in the cylinder in line with said passage.

33. The combination in an internal-combustion engine with the power-cylinder and its piston therein, of a supplemental piston in the power-cylinder, an air-cylinder outside of and axially in line with the power-cylinder, a piston in the air-cylinder, a rod passing through the power-cylinder head and connecting the piston in the air-cylinder with the supplemental piston, an air-pump, an air-receiver connected to said pump and to said air-cylinder and a check-valve interposed between said receiver and said cylinder and means for regulating the air-pressure carried in said receiver.

34. In an internal-combustion engine, a power-cylinder and its piston, a supplemental piston in the power-cylinder, an air-pressure agent connected to said supplemental piston for causing it to make its instrokes ahead of the power-piston, an air-pump for maintaining a minimum air-pressure in said agent, and means for governing said minimum pressure irrespective of the speed of the engine.

35. In a combustion-engine, a cylinder with the main piston therein, a supplemental piston in said cylinder movable with the main piston on its power-strokes and fluid-operated means independent of the main crank of the engine for causing the supplemental piston to scavenge the cylinder.

36. In combination with the cylinder of a combustion-engine provided with an exhaust-port adjacent to its head end and an intake-port adjacent to the limit of travel of the main piston on its power-strokes, a main piston in said cylinder, a supplemental piston in said cylinder movable with the main piston on its power-strokes and means operated by air-pressure for causing said supplemental piston to scavenge the cylinder.

37. The combination with the cylinder and main piston of a combustion-engine, a supplemental piston in said cylinder movable with the main piston on its power-strokes, and an air-pressure agent for operating said supplemental piston ahead of the main piston on its compression-strokes to exhaust said cylinder.

38. In a combustion-engine, a cylinder with its main piston therein, a supplemental piston in said cylinder movable by the expanding fluid with the main piston on its power-strokes and an air-pressure agent independent of the main piston for operating said supplemental piston to scavenge the cylinder.

39. In a combustion-engine, a piston supplemental to and independent of the main piston and movable with the main piston on its power-strokes, and an air-pressure operatively connected with the supplemental piston for moving it independently and ahead of the main piston to scavenge the engine-cylinder.

40. In a combustion-engine, a cylinder with its piston therein, another and supplemental piston in said cylinder movable with said piston on its power-strokes, an air-pressure operatively connected with the supplemental piston for moving it independently, and means whereby the supplemental piston on its independent strokes scavenges the cylinder.

In testimony whereof I affix my signature in presence of two witnesses.

HARRY COLE WAITE.

Witnesses:
JNO. S. GREEN,
C. T. BENEDICT.